(12) United States Patent
Bishop et al.

(10) Patent No.: US 9,103,269 B2
(45) Date of Patent: Aug. 11, 2015

(54) CHARGE AIR COOLER DUCT SYSTEM AND METHOD

(75) Inventors: Christopher B. Bishop, South Lyon, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 13/538,678

(22) Filed: Jun. 29, 2012

(65) Prior Publication Data

US 2013/0220457 A1 Aug. 29, 2013

Related U.S. Application Data

(60) Provisional application No. 61/603,787, filed on Feb. 27, 2012.

(51) Int. Cl.
*F02B 29/04* (2006.01)
*F02N 3/00* (2006.01)
*F02M 25/07* (2006.01)

(52) U.S. Cl.
CPC .......... *F02B 29/0468* (2013.01); *F02M 25/074* (2013.01); *F02M 25/0726* (2013.01); *F02N 3/00* (2013.01); *Y02T 10/146* (2013.01); *Y10T 137/794* (2015.04)

(58) Field of Classification Search
USPC ......... 137/171, 177, 314, 573, 574, 575, 576; 60/278, 309, 599; 123/542, 563; 138/116, 117; 285/13, 14
See application file for complete search history.

(56) References Cited

U.S. PATENT DOCUMENTS

| | | | | |
|---|---|---|---|---|
| 4,057,075 | A * | 11/1977 | Muschelknautz et al. | 137/171 |
| 5,189,878 | A * | 3/1993 | Robinson et al. | 60/309 |
| 5,218,985 | A * | 6/1993 | Berger et al. | 137/8 |
| 6,748,741 | B2 * | 6/2004 | Martin et al. | 60/605.2 |
| 7,451,750 | B1 * | 11/2008 | Fox et al. | 123/568.12 |
| 7,587,894 | B2 * | 9/2009 | Kang et al. | 60/309 |
| 7,926,272 | B2 * | 4/2011 | Takemoto | 60/605.2 |
| 8,307,643 | B2 | 11/2012 | Quinn et al. | |
| 2008/0190079 | A1 * | 8/2008 | Cerdes | 55/319 |
| 2010/0050578 | A1 * | 3/2010 | Khouw | 55/290 |
| 2011/0094219 | A1 * | 4/2011 | Palm | 60/599 |

* cited by examiner

*Primary Examiner* — William McCalister
*Assistant Examiner* — Ian Paquette
(74) *Attorney, Agent, or Firm* — Julia Voutyras; Alleman Hall McCoy Russell & Tuttle LLP (57) ABSTRACT

A cold charge duct, a system and method are provided for removing and controlling the reintroduction of a condensate in diesel or gasoline engine intake air. The duct may include an exterior wall which may define a passage configured to pass air from a turbocharger to an engine. The exterior wall may have one or more openings, and a separator formed to be substantially flush with an inner surface of the external wall. In this way, it is possible to utilize an edge-based separator to generate a sudden decrease in the flow rate thereby causing a water condensate to drop into the openings for later reintroduction into the engine.

17 Claims, 7 Drawing Sheets

CHARGE AIR COOLER DUCT SYSTEM AND METHOD

RELATED APPLICATIONS

The present application claims priority to U.S. Patent Application No. 61/603,787, filed on Feb. 27, 2012, the entire contents of which are hereby incorporated by reference for all purposes.

FIELD

The present application relates to methods and systems for cooling diesel and gasoline engine charge air after being compressed by a compressor, and specifically methods and systems wherein one or more condensate traps are coupled with the charge cooling duct and configured to remove condensate from the intake air, and control its reintroduction.

BACKGROUND AND SUMMARY

Vehicle engines may be configured to operate using diesel or gasoline fuels. Many diesel and gasoline engines include turbochargers, or superchargers configured to force more air mass into an engine's intake manifold and combustion chamber by compressing intake air with a compressor driven by a turbine disposed to capture energy from the flow of the engine exhaust gas. However, compression tends to heat the intake air, leading to a reduction of the density of this charge air. Charge air coolers may be used to compensate for heating caused by supercharging.

However, under certain speed, load, and atmospheric conditions, the charge air cooler can generate a large quantity of water condensate, which can remain trapped within the charge air cooler under steady state conditions. Upon wide open throttle command, a large mass rate of air is blown through the charge air cooler, and the result may be a large quantity of condensate being ingested by the engine. The inventors herein have recognized that with certain manifold designs, this ingested condensate may be concentrated in a single bank of cylinders, which may cause misfire conditions. The inventors herein have further recognized a slow ingestion rate may help to reduce misfire conditions.

Various embodiments in accordance with the present disclosure provide one or more condensate traps that may be located in the cold charge duct (CCD), such as downstream of a charge air cooler, but upstream of the engine intake manifold. An example trap may include a reservoir bonded to the cold charge duct via, for example, plastic welding to provide a pres sure-tight seal. The trap may be sized so that the velocity of the condensate will quickly drop, allowing the water to pool at the bottom of the trap. The trap may include a drain spigot that may use a flow rate metering foam structure, which may reduce rapid discharge of the trapped condensate. The trap open end (open to the CCD) may be shaped in such a fashion as to facilitate the entrainment of water/air through the opening in the CCD. The shape may be, for example, a curved structure located at the head of the trap reservoir. The trap opening may be created by cutting a semicircle of CCD material and forming it into an inlet edge protruding into the cold charge duct flow stream. In this way, condensate entrained in the air flow may tend to be intercepted by the trap inlet and forced into the large diameter trap, losing velocity and falling to the bottom to be slowly re-ingested, the re-ingestion flow rate limited by the metering structure.

Various embodiments may be configured to be easily packaged underhood. Embodiments may be more cost effective than, for example, a new CAC design or centrifugal trap designs. Embodiments may be applicable to various turbocharging, supercharging, or otherwise boosted engine applications with a charge air cooler.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4-11 are drawn to scale, although other relative dimensions and positioning may be used, if desired.

DETAILED DESCRIPTION

Figure 1:
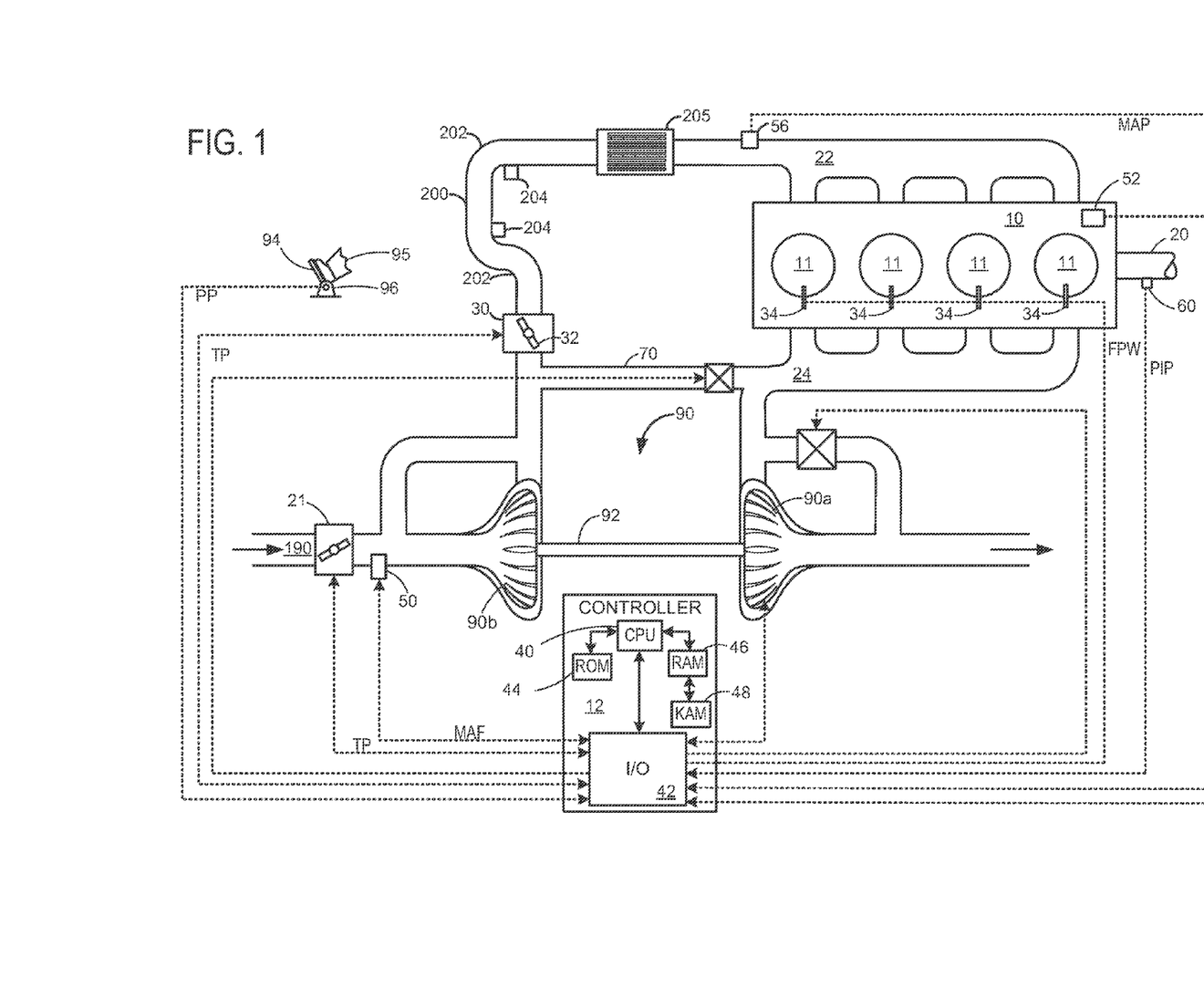
FIG. 1 shows an example vehicle system layout, including an air intake system and a charge cooling duct.

FIG. 1 shows an example of a diesel engine system generally at 10, which may also be a gasoline engine. Specifically, internal combustion engine 10 comprises a plurality of cylinders 11, which may utilize direct fuel injection and/or spark-ignition. Engine 10 is controlled by electronic engine controller 12. Engine 10 includes combustion chamber and cylinder walls with a piston positioned therein and connected to crankshaft 20. The combustion chamber communicates with an intake manifold 22 and an exhaust manifold 24 via respective intake and exhaust valves.

Intake manifold 22 communicates with throttle body 30 via throttle plate 32. In one embodiment, an electronically controlled throttle can be used. In some embodiments, the throttle is electronically controlled to periodically, or continuously, maintain a specified vacuum level in intake manifold 22. While throttle body 30 is depicted as being downstream of a compressor device 90b, it will be appreciated that the throttle body may be placed upstream or downstream of the compressor. The choice may depend partly on the specific EGR system or systems that is/are used. Alternatively, or additionally, a throttle body may be placed in the exhaust line to raise exhaust pressure. This may be effective in helping to drive EGR, but may not be effective in reducing total mass flow through the engine.

The combustion chamber is also shown having fuel injectors 34 coupled thereto for delivering fuel in proportion to the pulse width of signal (fpw) from controller 12. Fuel is delivered to the fuel injectors 34 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, and includes a microprocessor unit 40, input/output ports 42, electronic memory 44, which may be an electronically programmable memory in this particular example, random access memory 46, keep alive memory 48, and a conventional data bus.

Controller 12 receives various signals from sensors coupled to engine 10, which may include but may not be limited to: measurements of inducted mass airflow (MAF) from mass airflow sensor 50; engine coolant temperature (ECT) from temperature sensor 52 manifold pressure (MAP) from manifold pressure sensor 56 coupled to intake manifold 22; a measurement of throttle position (TP) from a throttle position sensor (not shown) coupled to throttle plate 32; and a profile ignition pickup signal (PIP) from Hall effect sensor 60 coupled to crankshaft 20 indicating engine speed.

Engine 10 may include an exhaust gas recirculation (EGR) system to help lower $NO_X$ and other emissions. For example, engine 10 may include a high pressure EGR system in which exhaust gas is delivered to intake manifold 22 by a high pressure EGR passage 70 communicating with exhaust manifold 24 at a location upstream of an exhaust turbine 90a of a compression device 90, and communicating with intake manifold 22 at a location downstream of an intake compressor 90b of the compression device 90. A high pressure EGR valve assembly (not shown) may be located in high pressure EGR passage 70. Exhaust gas may then travel from exhaust manifold 24 first through high pressure EGR passage 70, and then to intake manifold 22. An EGR cooler (not shown) may be included in high pressure EGR tube 70 to cool re-circulated exhaust gases before entering the intake manifold. Cooling may be done using engine water, but an air-to-air heat exchanger may also be used. Alternatively or additionally, a low pressure EGR system may be included in engine 10.

Compression device 90 can be a turbocharger or any other such device. The depicted compression device 90 has a turbine 90a coupled in the exhaust manifold 24 and a compressor 90b coupled in the intake manifold 22. Turbine 90a is typically coupled to compressor 90b via a drive shaft 92. A sequential turbocharger arrangement, single VGT, twin VGTs, or any other arrangement of turbochargers could be used.

Further, drive pedal 94 is shown along with a driver's foot 95. Pedal position sensor (pps) 96 measures the angular position of the driver actuated pedal. Further, engine 10 may also include exhaust air/fuel ratio sensors (not shown). For example, either a 2-state EGO sensor or a linear UEGO sensor can be used. Either of these may be placed in the exhaust manifold 24, or downstream of the compression device 90.

It will be understood that the depicted diesel engine 10 is shown only for the purpose of example, and that the systems and methods described herein may be implemented in or applied to any other suitable engine having any suitable components and/or arrangement of components, including gasoline engines.

Embodiments of the engine system 10 may also include a cold charge duct 200 that may also include a discrete intercooler, or charge air cooler 205. The duct 200 may include one or more bends 202, for example two bends 202 as illustrated in FIG. 1. One or more condensate traps 204 may be located adjacent to and just downstream of each of the bends 202. The charge air cooler 205 may be arranged upstream and/or downstream and/or between the traps 204.

Figure 2:
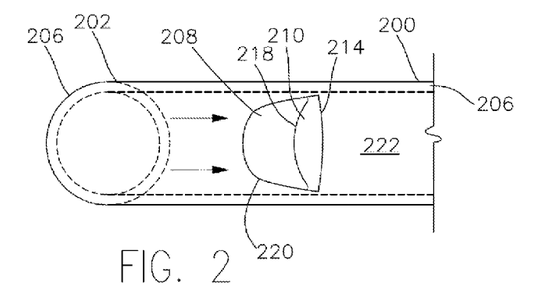
FIG. 2 is a bottom view of a charge cooling duct modified in accordance with the present disclosure.

FIG. 2 is a bottom view of a duct 200 for a charge air cooler modified in accordance with the present disclosure. The duct 200 may include an exterior wall 206 defining a passage configured to pass air from a turbocharger to an engine. The exterior wall 206 may have one or more openings 208.

Figure 3A:
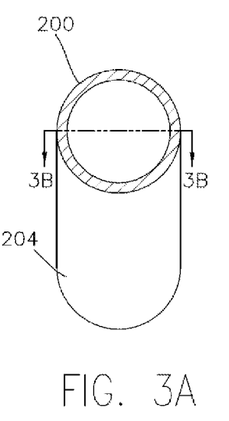
FIG. 3A is a side sectional view of the modified cooling duct shown in FIG. 2 having a condensate trap attached to the bottom thereof.
Figure 3B:
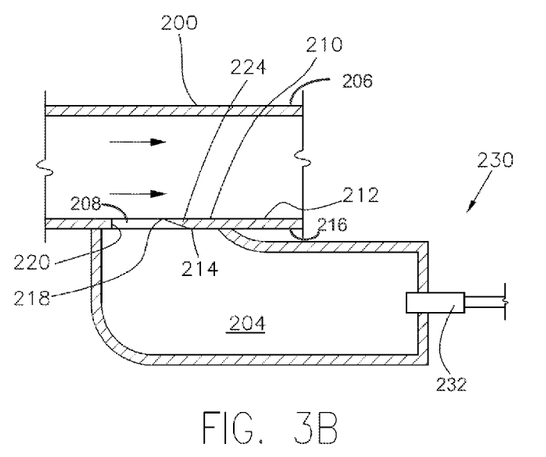
FIG. 3B is a sectional view of the modified cooling duct shown in FIG. 2 with the section taken at 3B-3B in FIG. 3A.
Figure 4:
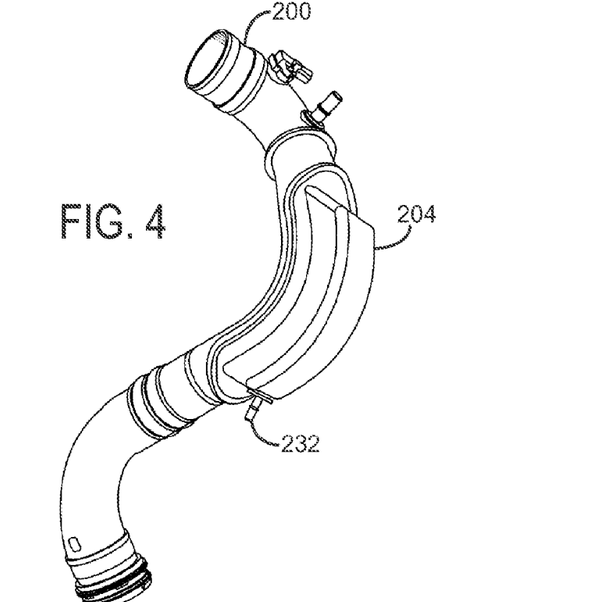
FIGS. 4 through 9 are various top, side and front views illustrating various example embodiments in accordance with the present disclosure.
Figure 5:
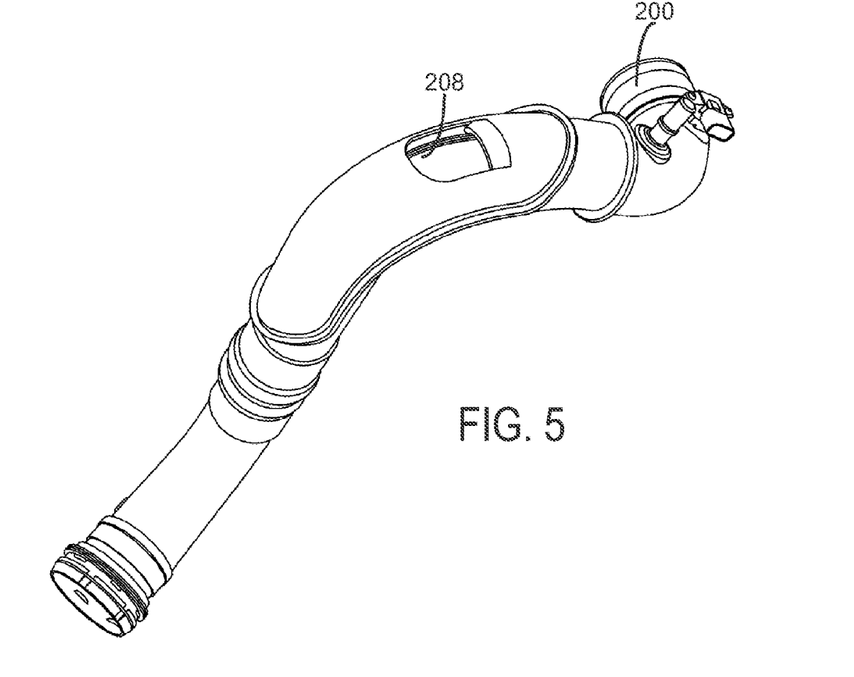
Figure 6:
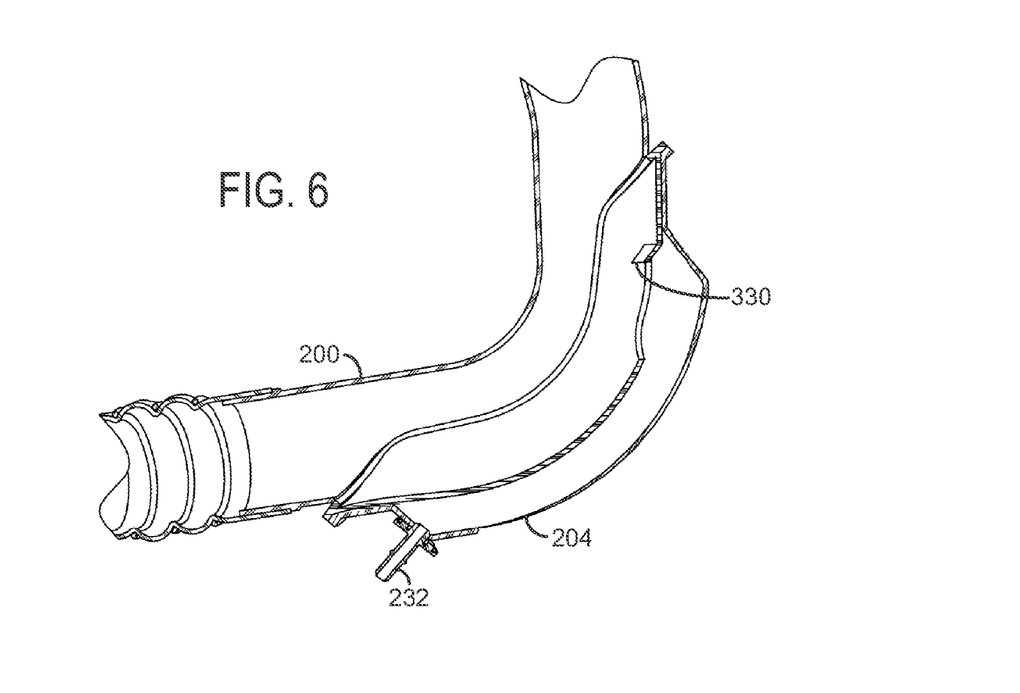

FIG. 3A is a side sectional view of the modified cooling duct shown in FIG. 2, and FIG. 3B is a sectional with the section taken at 3B-3B in FIG. 3A. A separator 210 may be formed to be substantially flush with an inner surface 212 of the exterior wall 206.

The one or more openings 208 may be formed by, for example, a cut in the exterior wall 206. The separator 210 may include a first curved edge 214 intersecting an outer surface 216 of the exterior wall 206 and a second curved edge 218 intersecting the inner surface 212. In some examples the second curved edge 218 may be substantially parabolic. The cut may be formed by cutting, for example, a semi-circular portion of the exterior wall 206.

The second curved edge 218 may be a downstream edge 218 of the opening 208. The downstream edge 218 may be blade forming. A third curved edge 220 may define an upstream edge 220 of the opening 208. The downstream edge 218 and the upstream edge 220 may each be parabolic. In some embodiments the upstream edge 220 may form a deeper parabola than the downstream edge 218.

The one or more openings may be located at a bottom 222 of the duct 200. The duct 200 may also include one or more condensate traps 204 (e.g., FIGS. 3A and 3B) sealed to the duct 200 below each of the respective one or more openings 208. In this way a condensate may drop into the one or more traps 204.

As illustrated with cross section FIG. 3B the separator 210 may have a substantially wedge shaped end 224 which may terminate with the downstream edge 218 configured to face toward a flow passing through the duct 200.

Embodiments may provide a duct 200 for a charge air cooler. The duct 200 may include a duct wall 206 having an inner duct surface 212 and an outer duct surface 216. There may be an opening 208 in the duct wall 206. A hollow encasing element 204 may be attached to the outer duct surface 216 forming a sealed hollow over the opening 208. A separator 210 may be coupled with the opening 208.

A flow rate metering structure 230 may be configured to allow a liquid condensate to pass readily into the hollow and configured to control a rate of flow of the liquid condensate out of the hollow and toward a combustion chamber coupled with the duct 200. In some cases the flow rate metering structure 230 may be the shape and structure of the opening 208 including, for example the wedge shaped end 224 and the downstream edge 218. In some cases the flow rate metering structure 230 may be a drain spigot 232, or a combination of the opening 208, the surrounding structure, and the drain spigot 232; e.g., the drain spigot 232 coupled with the hollow 204 may be configured to control a rate of flow of the liquid condensate out of the hollow and toward a combustion chamber coupled with the duct.

In one embodiment, the hollow 204 is positioned on an outside of a bend (as opposed to the inside of the bend). Further the hollow 204 is positioned on the pipe with the drain spigot 232 at least partially pointing downward with respect to vertical such that condensate may be drawn out at least partially via gravity.

FIGS. 4 through 9 are various top, side and front views illustrating various example embodiments in accordance with the present disclosure. With some example embodiments the separator 210 may be positioned flush with the inner duct surface 212 as shown in FIG. 3B. With other example embodiments the separator 210 may be a protrusion 330 as illustrated, for example, in FIGS. 6 and 9. The protrusion 330 may be attached to, for example, a downstream edge of the opening.

The protrusion may extend a protrusion distance, which may be, for example, approximately between 8 mm and 16 mm. In some cases it may be approximately 12 mm. The protrusion 330 may be considered to be, of function as a scraper 330, or the like. The scraper 330 may be configured to skim water from the surface of a puddle of the condensate accumulated in the one or more locations and may be further configured to not remove water entrained in an air stream passing through the duct 200. The separator may include a curved edge configured to extend into an oncoming flow of air passing through the duct. In this way the curved edge may be in line with the inner surface 212 of the duct 200.

Figure 7:
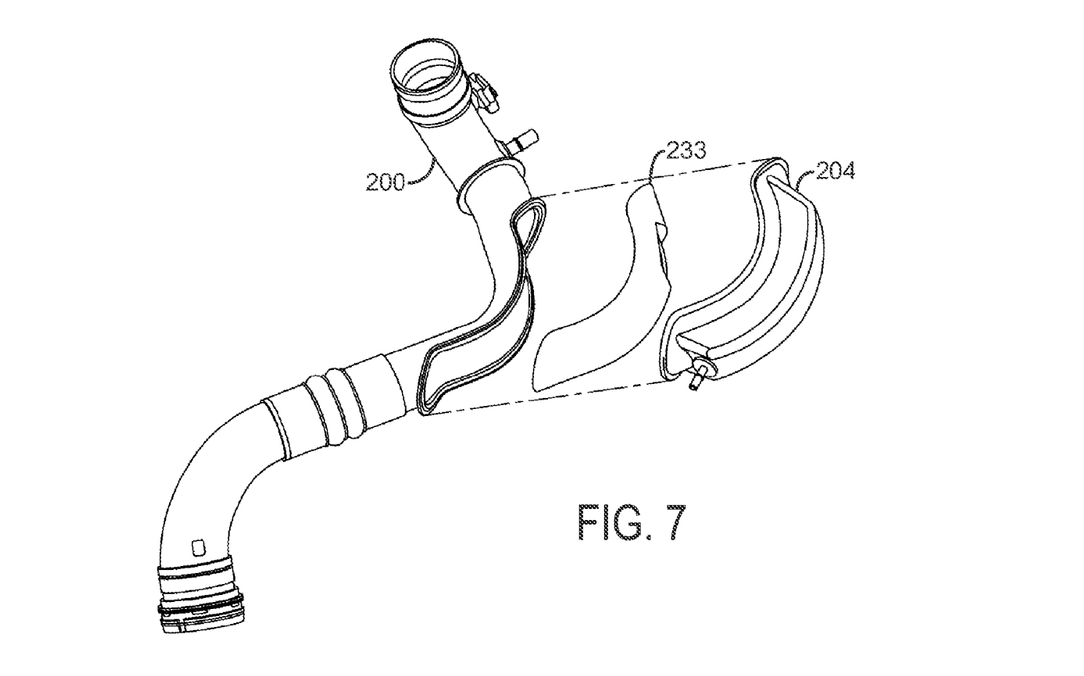
Figure 8:
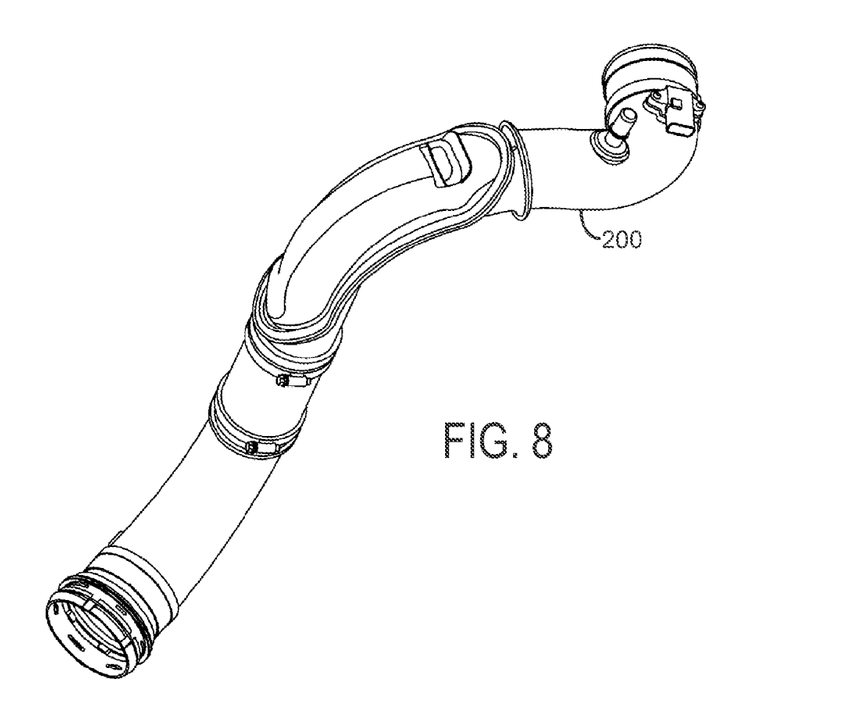
Figure 9:
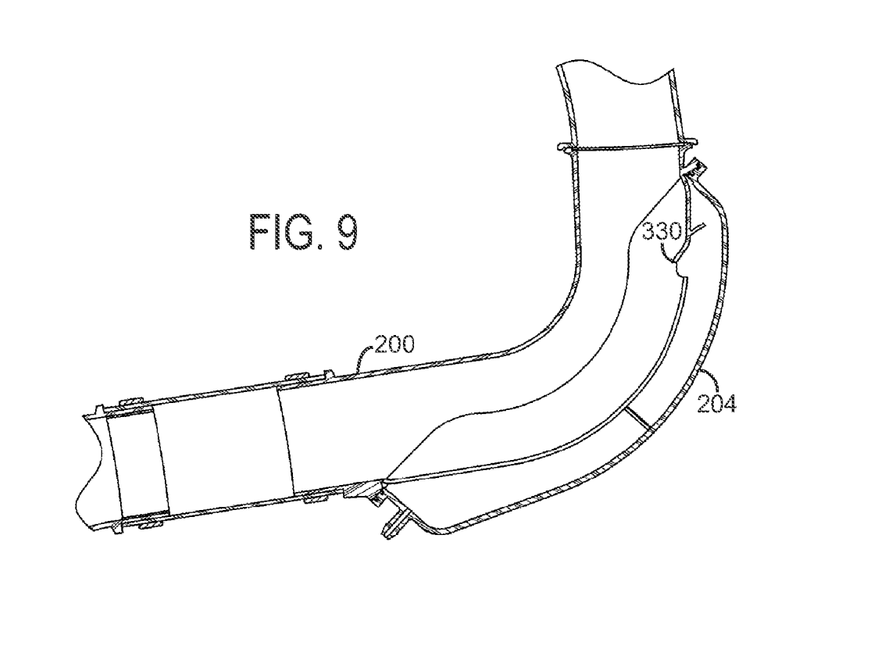

Embodiments may provide a charge air cooler duct which may include a generally constant duct cross sectional area along all but a selected one or more locations along the length of the duct, the one or more locations may have a larger cross sectional area than the duct cross sectional area. A wall at the one or more locations may separate the larger cross sectional area into a first portion having a cross sectional area substantially equal to the duct cross sectional area and a second portion. The second portion may be formed with an enclosing member sealed along edges of the enclosing member to an outside surface of the duct. The wall may have an opening configured to allow a condensate to pass through. In this way, various embodiments may be configured as a single piece in, for example, a single molding operation that may include a duct member as shown in FIG. 2 made integrally with a trap member as illustrated in FIG. 3B. The wall may be formed in the same operation, or in a separate operation. Such example embodiments may similarly function such that a speed of flow of a fluid through the duct will quickly drop as the fluid passes the one or more locations to encourage a liquid condensate to accumulate at the one or more locations. As seen in FIG. 7, some embodiments may include a trap cover 233. While shown as a separate component, trap cover 233 may be formed integrally with trap 204.

Figure 10:
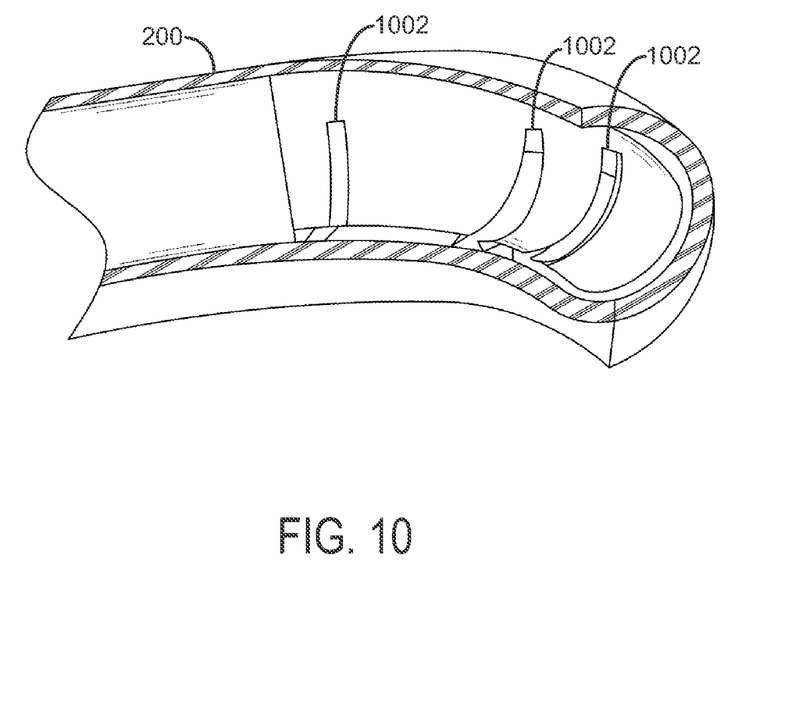
FIG. 10 is a magnified view of an embodiment of a charge cooling duct in accordance with the present disclosure.

Turning now to FIG. 10, the one or more openings 1002 may be, for example three in number. With other examples the one or more openings may be five in number. The five openings may be three openings grouped relatively close to one another and two of the five openings are spaced relatively further from each other and from the group of three openings.

Figure 11:
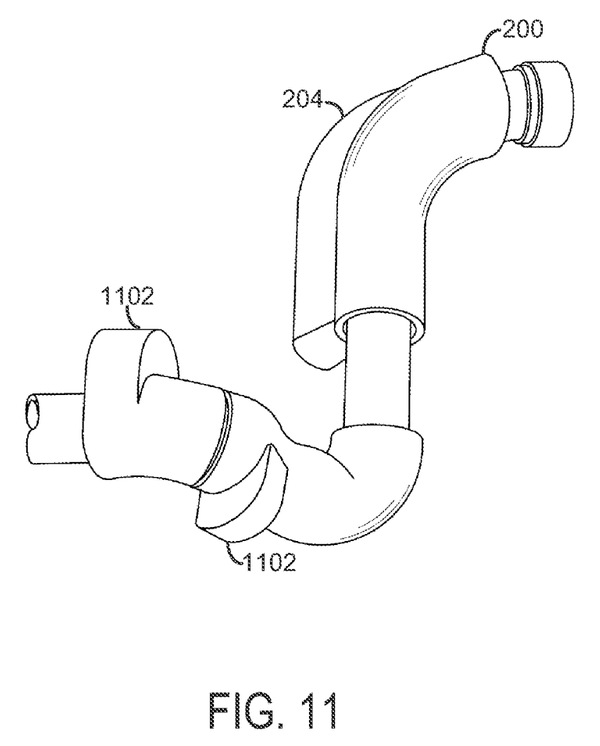
FIG. 11 is a perspective view of yet another embodiment of a charge cooling duct in accordance with the present disclosure.

Embodiments may provide a duct for use with a charge air cooler. The duct may include a duct wall having an inner duct surface and an outer duct surface; the duct wall having an opening; a separator formed to be substantially flush with the inner duct surface defining a trailing edge of the opening; and a hollow encasing element attached to the outer duct surface forming a sealed hollow over the opening. FIG. 11 shows an example embodiment in which two planar separators 1102 are included in the duct 200.

Various embodiments may provide a method of forming a charge air cooler. The method may include cutting an opening into a duct configured to provide cooled charge air to a combustion chamber of an engine; sealing a chamber over the opening; and forming an edge on the opening relative to the duct and the chamber such that air passing the opening will experience a sudden decrease in the flow rate thereby causing a water condensate to drop into the chamber, and such that a sudden blast of air through the duct will cause a controlled reintroduction of a portion of the condensate into the blast of air.

With some examples the forming an edge may include forming the edge flush with an inside surface of the duct. With other examples the forming an edge may include positioning the edge as a separator extending into the duct an extension distance. The extension distance to be between approximately 8 mm to 16 mm. In some cases the extension distance to be approximately 12 mm.

With some examples the cutting an opening may include cutting additional openings in one or more additional locations. Each of the opening and the one or more additional openings may be located substantially immediately downstream of bends in the duct.

The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A charge air cooler duct, comprising:
a uniformly thick exterior wall defining a passage that passes air from a turbocharger to an engine, the wall having one or more openings, an inner surface defining a constant cross-sectional area, and a separator substantially flush with an exterior wall inner surface across an entire flush interface defining the opening, the opening including a downstream and upstream edge, the upstream edge a deeper parabola than the downstream edge.

2. The duct of claim 1, wherein the one or more openings are located at a bottom of the duct, and further comprising one or more condensate traps sealed to the duct below each of the respective one or more openings.

3. The duct of claim 1, wherein the one or more openings are formed by a cut in the exterior wall, and wherein the separator includes a surface defining a part of the one or more openings, the surface extending from a first curved edge intersecting an outer surface of the exterior wall to a second curved edge intersecting the inner surface at an angle relative to an axis of the duct.

4. The duct of claim 3, wherein the first and second curved edges curve radially outward from the axis of the duct, and wherein the second curved edge of the surface is the downstream edge of the opening, and further comprising a third curved edge defining the upstream edge of the opening.

5. The duct of claim 3, wherein the one or more openings have the downstream edge configured to face toward a flow passing through the duct.

6. A duct for a charge air cooler comprising:
- a duct wall having an inner duct surface and an outer duct surface,
- an opening in the duct wall, the opening including a portion of the diameter of the duct wall such that opposite of the opening is a solid wall, and further including a downstream and upstream edge, the upstream edge a deeper parabola than the downstream edge;
- a hollow encasing element attached to the outer duct surface forming a sealed hollow over the opening; and
- a separator coupled with the opening, the separator formed integrally with the duct, and including a surface extending from the inner duct surface to the outer duct surface at an angle relative to an axis of the duct.

7. The duct of claim 6, further comprising a drain spigot coupled with the hollow configured to control a rate of flow of a liquid condensate out of the hollow and toward a combustion chamber coupled with the duct.

8. The duct of claim 6, wherein the separator is located flush with the inner duct surface, and wherein the duct wall is of uniform thickness.

9. The duct of claim 6, wherein the separator includes a curved edge configured to extend into an oncoming flow of air passing through the duct.

10. The duct of claim 6, further comprising additional openings configured substantially similar to the opening, each of the opening and additional openings located adjacent to and downstream from bends in the duct.

11. The duct of claim 6, further comprising a flow rate metering structure configured to allow a liquid condensate to pass readily into the hollow and configured to control a rate of flow of the liquid condensate out of the hollow and toward a combustion chamber coupled with the duct.

12. The duct of claim 11, wherein the flow rate metering structure is a drain spigot.

13. A system comprising:
- a turbocharger with a compressor;
- a charge air cooler; and
- a charge air cooler duct downstream of the turbocharger compressor and upstream of the charge air cooler, the charge air cooler duct having a generally constant duct cross sectional area along all but a selected one or more locations along a length of the duct, each of the one or more locations having a larger cross sectional area than the duct cross sectional area, a uniformly thick wall separating the larger cross sectional area into a first portion having a cross sectional area substantially equal to the duct cross sectional area and a second portion at the one or more locations, the wall having an opening configured to allow a condensate to pass through, the opening coupled with a separator, the first portion, the separator and the wall formed integrally, the opening including a portion of the diameter of the duct wall such that opposite of the opening is a solid wall, and a blade forming a downstream edge of the opening, wherein the opening is formed by a semi-circular cut in the wall of the duct.

14. The system of claim 13, wherein the charge air cooler duct further comprises a flow rate metering structure coupled with the second portion and configured to allow a liquid condensate to pass readily out of the first portion and configured to control a rate of flow back into the first portion, wherein the flow rate metering structure is a drain spigot, the charge air cooler duct further comprising a curved structure defining the downstream edge of the opening.

15. The system of claim 13, wherein the second portion is formed with an enclosing member sealed along edges of the enclosing member to an outside surface of the duct, the charge air cooler duct further comprising a protrusion attached to the downstream edge of the opening, the edge extending a protrusion distance into the first portion.

16. The system of claim 15, wherein the protrusion is a scraper, wherein the scraper is configured to skim water from a surface of a puddle of the condensate accumulated in the one or more locations and is further configured to not remove water entrained in an air stream passing through the duct.

17. A duct fluidically coupled with a charge air cooler comprising:
- a duct wall having an inner duct surface and an outer duct surface;
- the duct wall having an opening, the opening including a downstream and upstream edge, the upstream edge a deeper parabola than the downstream edge;
- a separator formed to be substantially flush with the inner duct surface defining a trailing edge of the opening, the separator including a first curved edge intersecting the outer duct surface and a second curved edge intersecting the inner duct surface, the first and second curved edges defining the opening and curving radially outward from an axis of the duct; and
- a hollow encasing element attached to the outer duct surface forming a sealed hollow over the opening.

* * * * *